(12) United States Patent
Miyashita

(10) Patent No.: US 7,058,198 B1
(45) Date of Patent: Jun. 6, 2006

(54) IMAGE PROCESSING APPARATUS AND METHOD

(75) Inventor: Tomoyuki Miyashita, Kodaira (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 09/587,906

(22) Filed: Jun. 6, 2000

(30) Foreign Application Priority Data

Jun. 8, 1999 (JP) .................................. 11-161613
May 16, 2000 (JP) ............................. 2000-144001

(51) Int. Cl.
  *G06K 9/00* (2006.01)
  *G06K 9/36* (2006.01)
  *H04N 1/40* (2006.01)

(52) U.S. Cl. ....................... 382/100; 382/232; 358/3.28

(58) Field of Classification Search ................ 382/100, 382/232; 358/3.19, 3.28; 380/205, 216, 380/207–210

See application file for complete search history.

(56) References Cited

U.S. PATENT DOCUMENTS 5,636,292 A    6/1997    Rhoads

*Primary Examiner*—Duy M. Dang

(74) *Attorney, Agent, or Firm*—Fitzpatrick, Cella, Harper & Scinto

(57) ABSTRACT

Although a copying machine which has finally output a forged print can be specified by the forgery tracking function, a copying machine which has output an original used for copying or a scanner used to read the images of bills or securities cannot be specified. For this purpose, history information embedded in input image data is extracted. When the history information is extracted, information unique to the apparatus is added to the history information. When no history information is extracted, history information containing information unique to the apparatus is generated. The generated or updated history information is embedded in the image data.

9 Claims, 22 Drawing Sheets

FIG. 16

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

FIG. 17

| 5 | 1 | 2 | 3 | 4 |
|---|---|---|---|---|
| 10 | 6 | 7 | 8 | 9 |
| 15 | 11 | 12 | 13 | 14 |
| 20 | 16 | 17 | 18 | 19 |
| 25 | 21 | 22 | 23 | 24 |

IMAGE PROCESSING APPARATUS AND METHOD

FIELD OF THE INVENTION

The present invention relates to an image processing apparatus and method and, more particularly, to an image processing apparatus having a function of embedding additional information associated with image processing in image data and a method therefor.

BACKGROUND OF THE INVENTION

As the image quality of digital color image forming apparatuses such as printers and copying machines has remarkably improved, high-quality full-color prints are easy to obtain. That is, anybody can obtain a desired print by image processing using a high-performance scanner, printer, copying machine, or computer. This also poses a problem of forgery of bills or securities, so some image processing apparatuses are equipped with a function of preventing forgery.

The forgery preventing function is generally comprised of two functions: a forgery tracking function and a forgery recognition function. The forgery tracking function embeds, e.g., a regular dot pattern representing an ID or model code unique to the printing apparatus in an image to be printed. If a forged bill is found, the IP or model code is extracted from the dot pattern embedded in the image of the forged bill, thereby specifying the printing apparatus used for forgery.

As is known, such a dot pattern is embedded in a printed image formed from, e.g., yellow, magenta, cyan, and black color components, using yellow with the lowest visibility.

If it is determined that a digital image to be printed coincides with or is similar to a bill image registered in the apparatus in advance, the bill recognition function stops outputting the digital image or deforms the output image to prevent faithful output of the digital image.

FIG. 1 shows an apparatus that can be specified by the forgery tracking function from a print that was distributed via a plurality of apparatuses. A copying machine with an ID CB, which has finally output the image of the forged print, can be specified. However, a copying machine having an ID CA, which has output the original used for copying by the copying machine with the ID CB, i.e., the image used as the original, or a scanner with an ID SA, which has been used to read the images of the bills or securities, cannot be specified. Printers except copying machines do not always have the forgery tracking function. Hence, for even a printer used to output a forged print cannot be specified.

When progress in recent computer networks represented by the Internet and image data communication thereon are taken into consideration, information such as the above ID or model code need be embedded in images as many as possible. Especially, it is more preferable to efficiently embed history information representing an apparatus via which image data was distributed on a network.

SUMMARY OF THE INVENTION

The present invention has been made to solve the above problem, and has as its object to time-serially indicate history of image processing for an image.

In order to achieve the above object, according to a preferred aspect of the present invention, there is provided an image processing apparatus comprising: input means for inputting image data; and embedding means for embedding first information and second information representing whether the first information is the latest information in the image data as electronic watermark information.

It is another object of the present invention to provide a function of embedding additional information as many as possible in an input color image.

It is still another object of the present invention to recognize a plurality of apparatuses via which image data were distributed.

In order to achieve the above object, according to another preferred aspect of the present invention, there is provided an image processing apparatus comprising: input means for inputting image data having a plurality of color components; and embedding means for embedding first information and second information representing that the first information is the latest information in at least one of the plurality of color components as electronic watermark information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a view showing the threshold value array of the first or second dither pattern when M=5;

FIG. 17 is a view showing the threshold value array of the third or fourth dither pattern when M=5;

DESCRIPTION OF THE PREFERRED EMBODIMENTS

Image processing apparatuses according to the embodiments of the present invention will be described below in detail with reference to the accompanying drawings.

First Embodiment

[Outline]

In an embodiment, an electronic watermark technique as disclosed in U.S. Pat. No. 5,636,292 is used first to invisibly and time-serially additionally record history information containing device IDs registered in advance and unique to image input apparatuses such as a scanner and image output apparatuses such as a printer and copying machine in all images at the time of input and output. When the history information invisibly recorded (embedded) in the image is read, the history of image processing, i.e., a plurality of apparatuses used for forgery can be time-serially known. The present invention is not limited to use of the electronic watermark technique of the above-described U.S. Pat. No. 5,636,292 or an embodiment to be described later, as far as the method can embed history information in an image to be readable (decodable) later.

[System Configuration]

Figure 1:
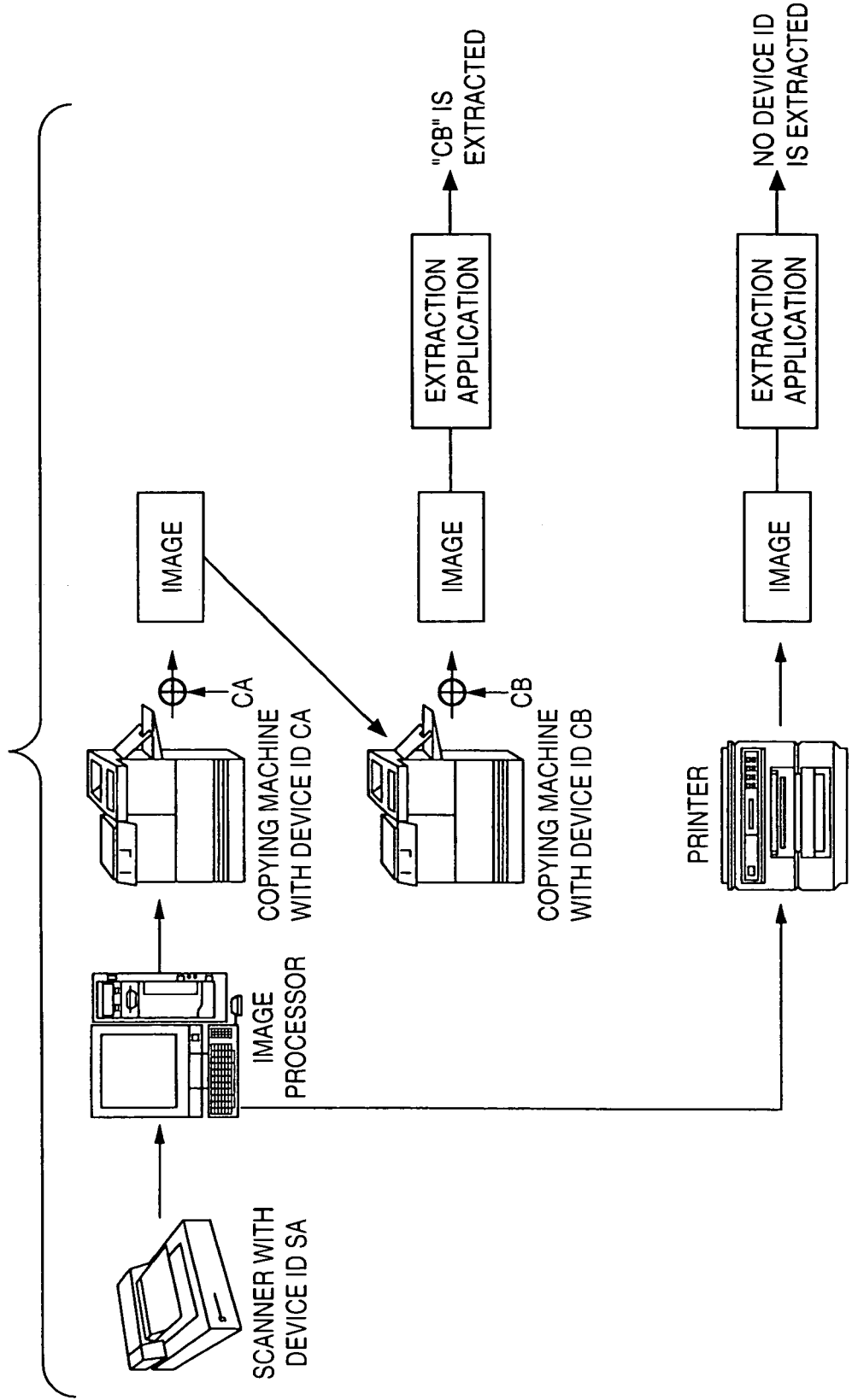
FIG. 1 is a view showing an apparatus that can be specified by the forgery tracking function from a print that was distributed via a plurality of apparatuses.
Figure 2:
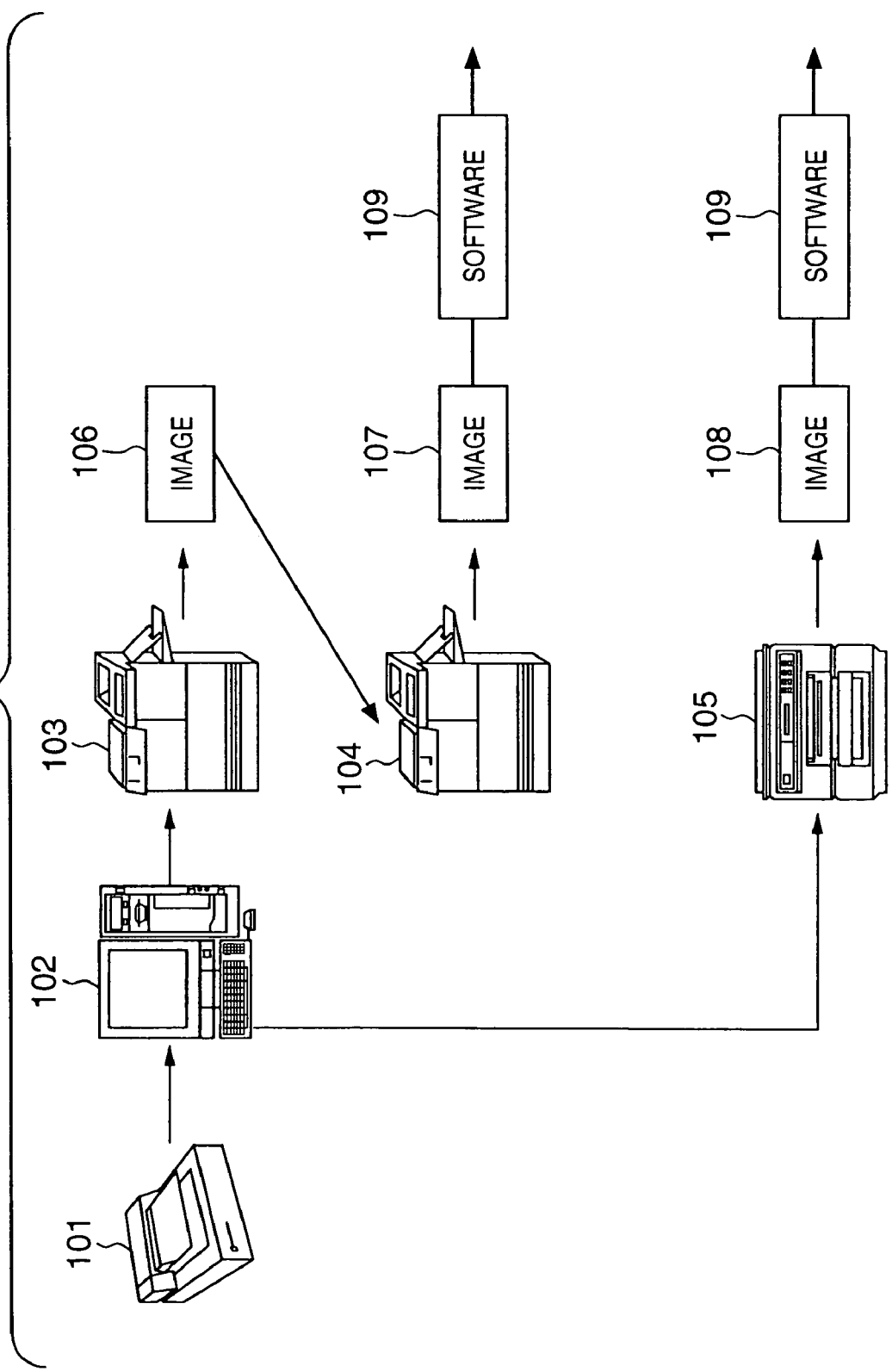
FIG. 2 is a view showing the system configuration of an embodiment.

FIG. 2 is a view showing the system configuration of this embodiment. Referring to FIG. 2, reference numeral 101 denotes an image input apparatus such as a scanner capable of embedding history information containing its device ID in a read image; 102, an image editing processing apparatus such as a personal computer capable of displaying the history information containing the device ID; 103 and 104, copying machines capable of embedding history information containing their device IDs in an output image; and 105, a printer capable of embedding history information containing its device ID in an output image.

Reference numeral 106 denotes an image output from the copying machine 103, in which the history information containing device IDs is embedded; 107, an image output from the copying machine 104, in which the history information containing device IDs is embedded; 108, an image output from the printer 105, in which the history information containing device IDs is embedded; and 109, software for extracting the history information containing the device IDs from the images.

[History Information]

Figure 3:
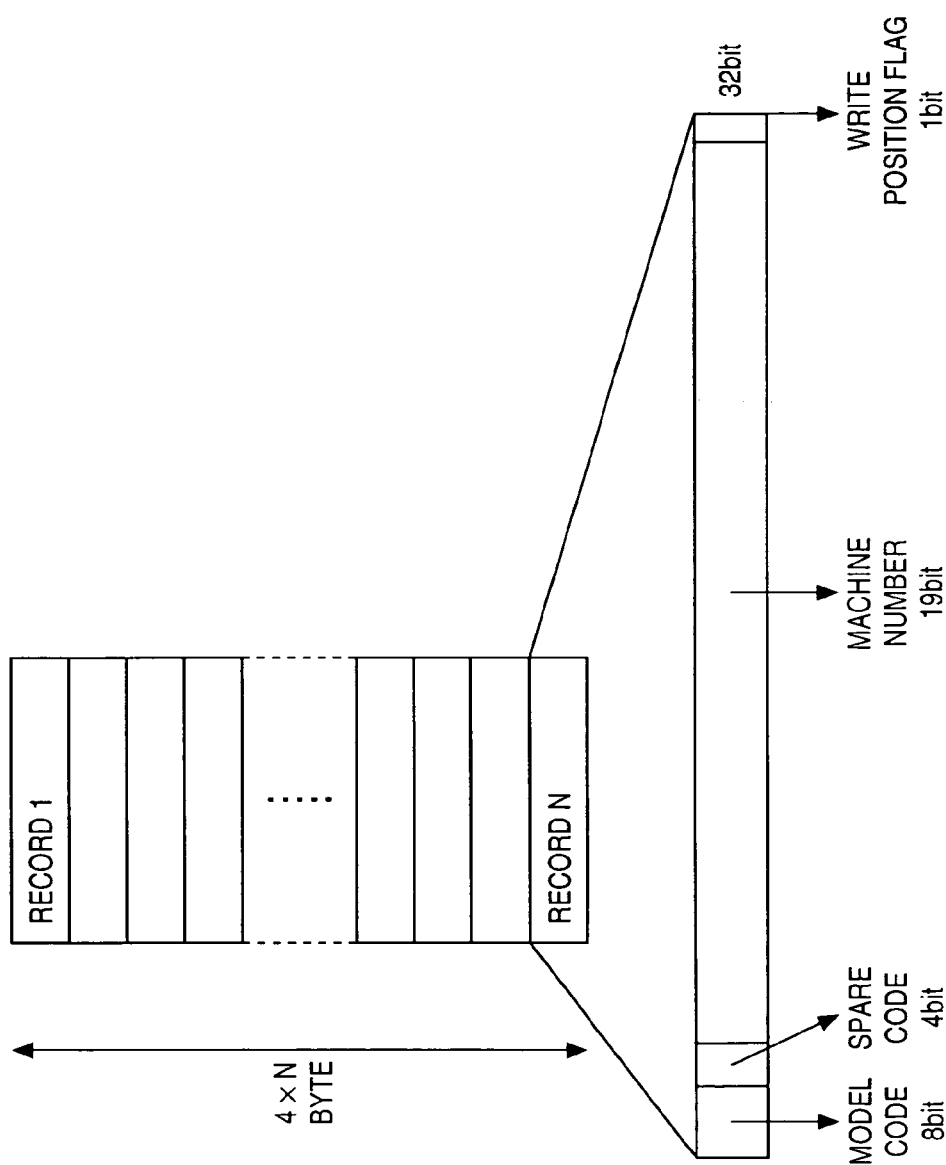
FIG. 3 is a view showing the structure of history information.

FIG. 3 is a view showing the structure of history information. History information has N records each of which comprises a total of 4 bytes: an 8-bit model code, 4-bit spare code, and 19-bit machine number which construct a device ID, and a 1-bit write position flag.

Information is written first in record 1 of the history information. The write position flag of the finally written record is ON, and the write position flags of the remaining records are OFF. In the history information, pieces of information are cyclically recorded. More specifically, when information is written in record N, the information of record 1 is overwritten next. That is, the 1-bit write position flag of each record is information representing whether the device ID corresponding to this flag is the latest information in all records.

[History Information Embedding Processing]

History information embedding processing in a scanner, printer and copying machine will be described next.

Figure 4:
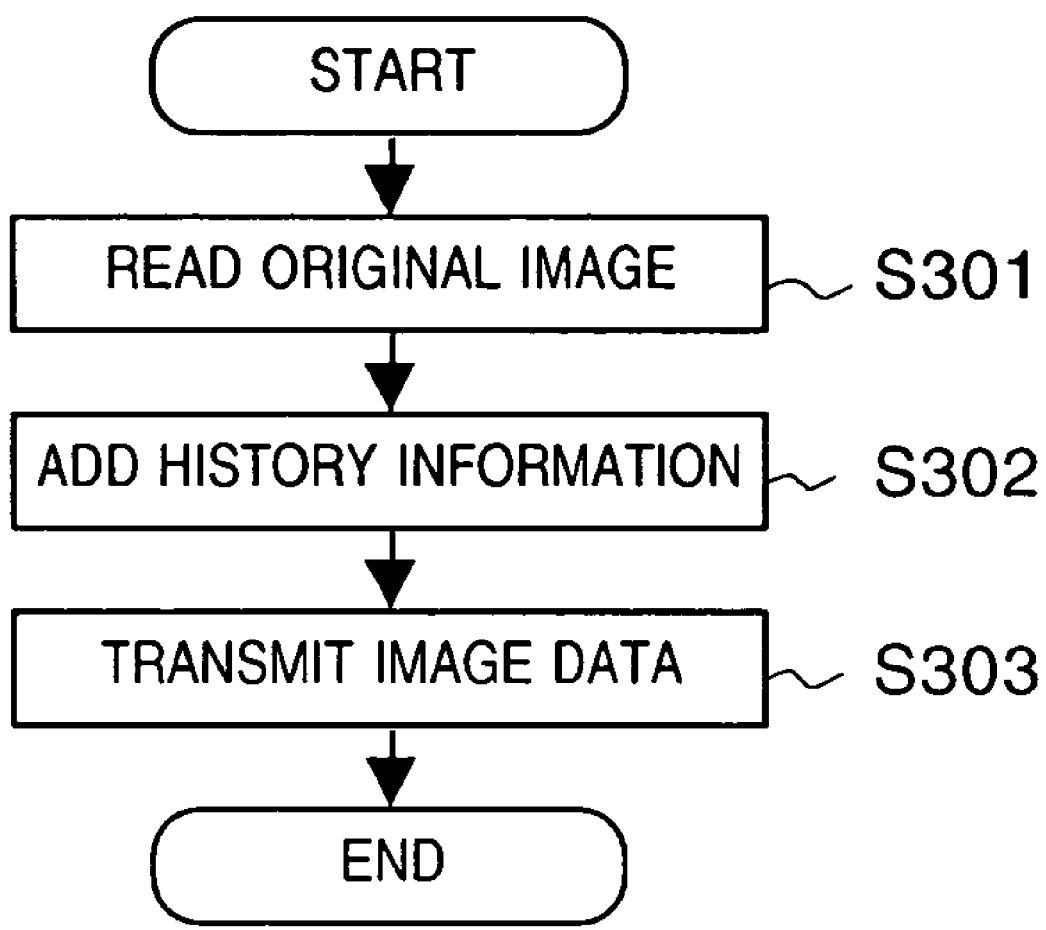
FIGS. 4 to 6 are flow charts showing embedding processing.
Figure 5:
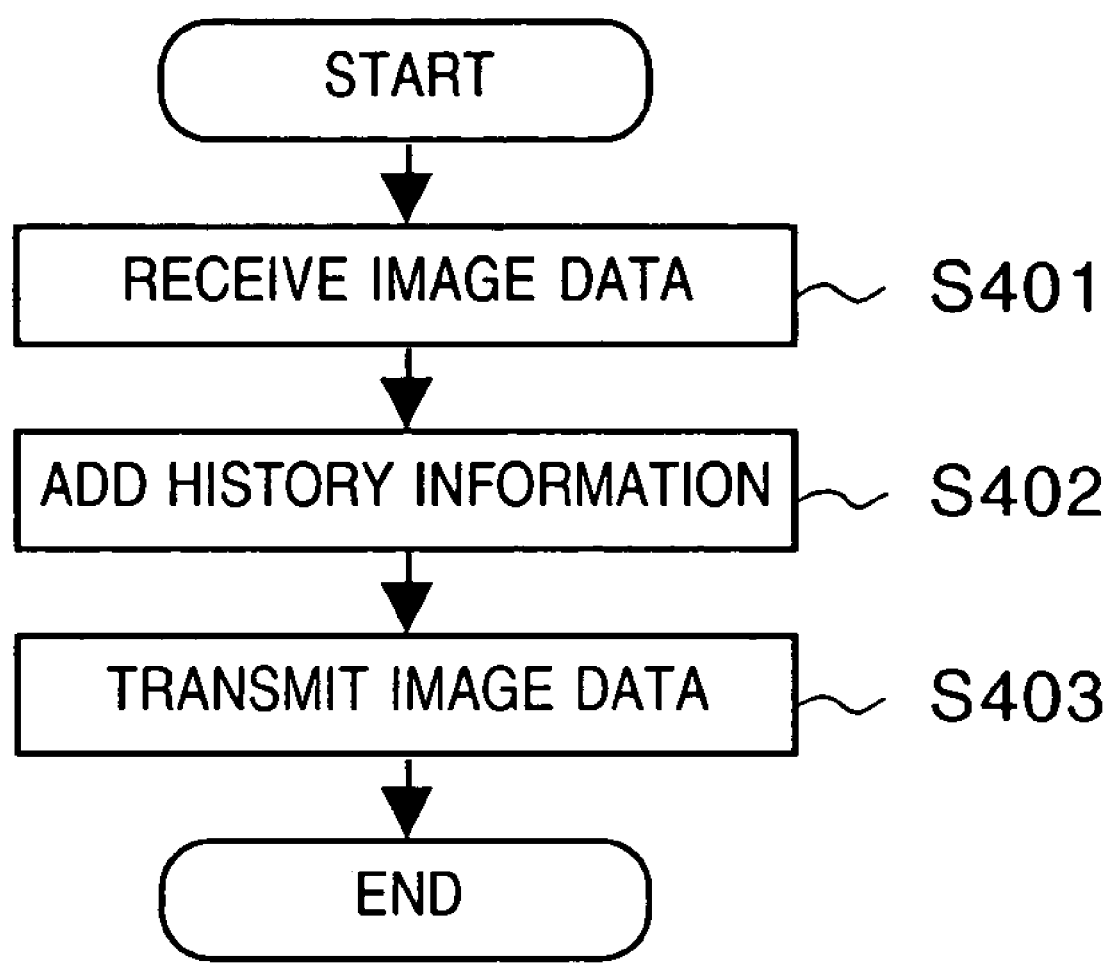
Figure 6:
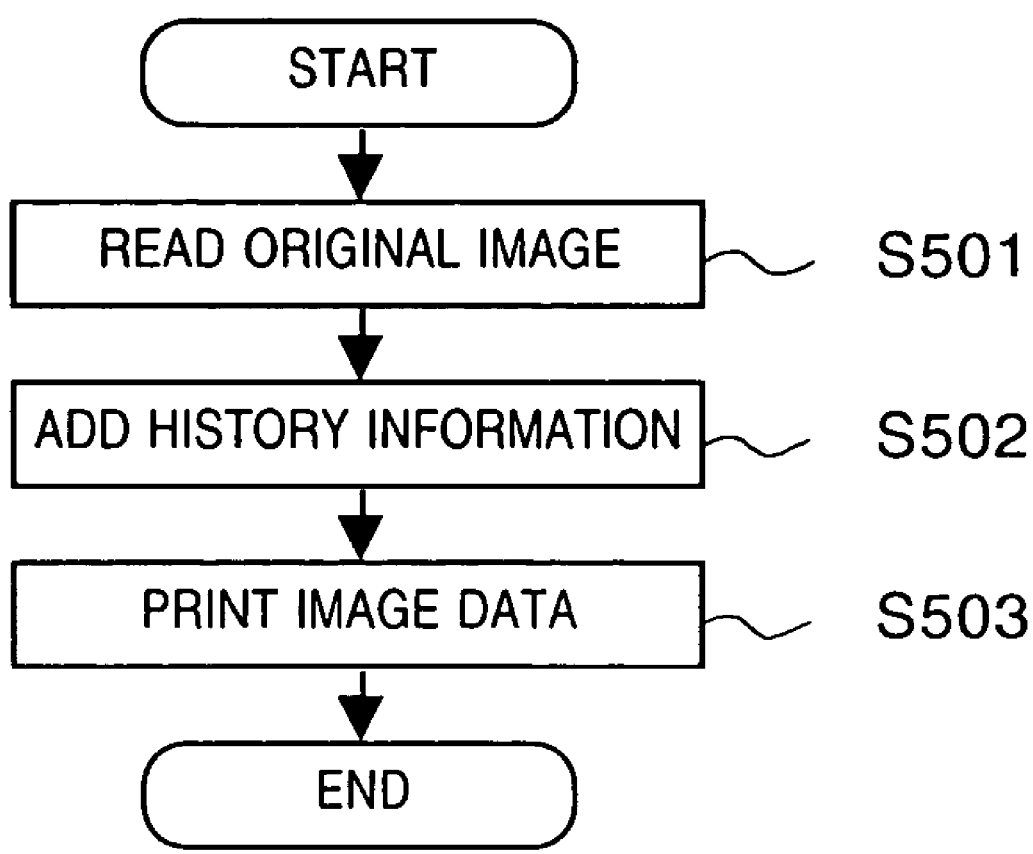

FIGS. 4 to 6 are flow charts showing embedding processing in the scanner 101, printer 105, and copying machines 103 and 104, respectively.

Referring to FIG. 4, the scanner 101 reads an original image and obtains A/D-converted digital image data (S301). History information embedded in the obtained image data is extracted, and history information corresponding to one record shown in FIG. 3, i.e., a model code, spare code, machine number, and write position flag are added (S302). The image data having the newly added history information is transmitted to the personal computer (S303). For an image having no history information, history information is newly embedded in step S302.

Referring to FIG. 5, the printer 105 receives the digital image data (S401), extracts the history information embedded in the received image data, and adds history information corresponding to one record shown in FIG. 3 (S402). The image data having the newly added history information is transmitted to the image forming section to form the image 108 (S403).

Referring to FIG. 6, the copying machine 103 or 104 reads the original image, obtains A/D-converted digital image data (S501), extracts the history information embedded in the obtained image data, and adds history information corresponding to one history shown in FIG. 3 (S502). The image data having the newly added history information is transmitted to the image forming section to form the image 106 or 107 (S503). For an image having no history information, history information is newly embedded in step S502.

Figure 7:
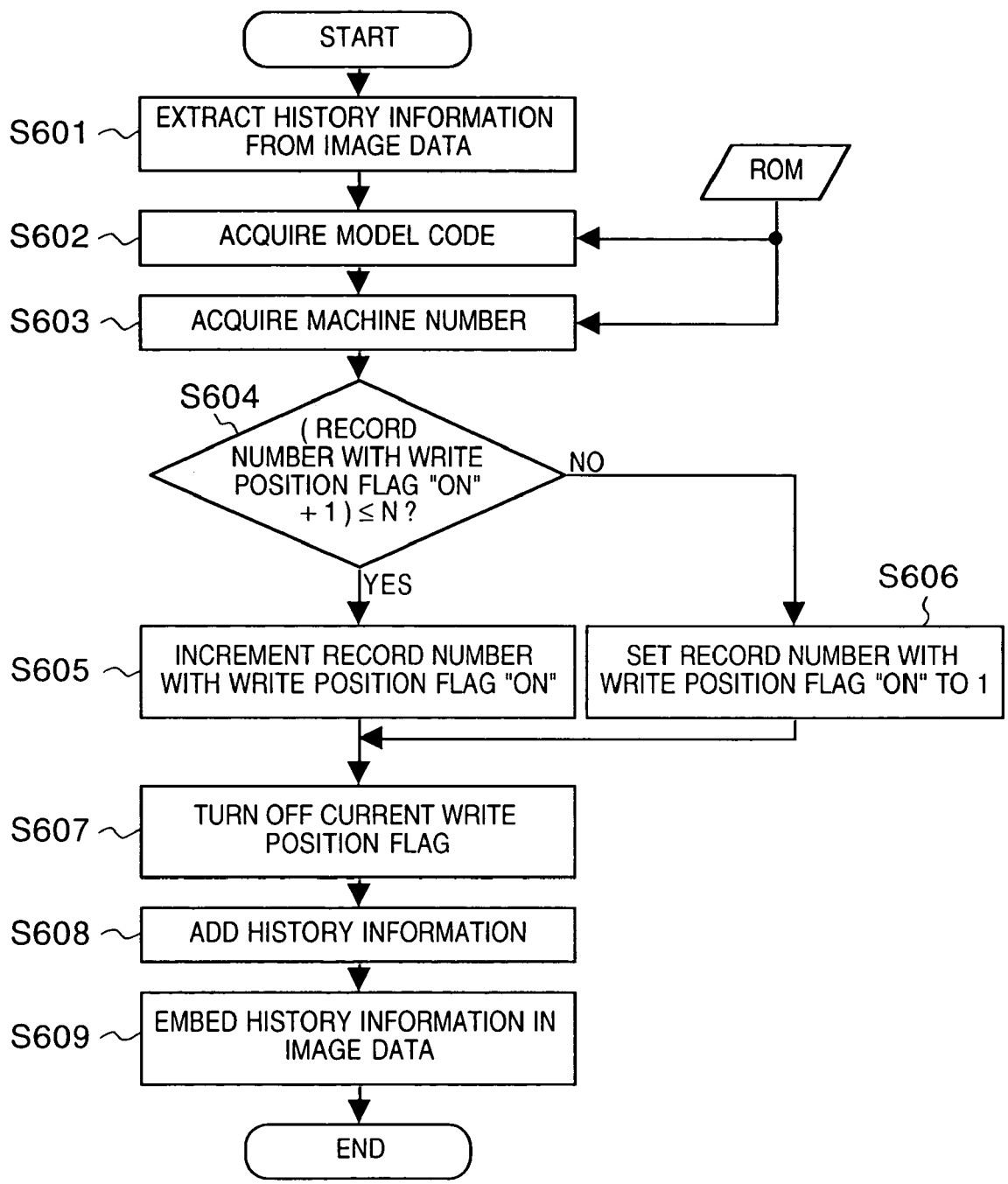
FIG. 7 is a flow chart showing details of history information adding processing.

FIG. 7 is a flow chart showing details of history information adding processing shown in FIGS. 4 to 6.

Referring to FIG. 7, history information embedded in image data is extracted in step S601. A model code and machine number which construct a device ID are read out from the ROM of the apparatus in steps S602 and S603. It is determined in step S604 whether a value X obtained by adding 1 to the record number with the write position flag "ON" in the extracted history information is N or less. If X≦N, the record number whose write position flag is to be turned on is incremented to X in step S605. If X>N, the record number whose write position flag is to be turned on is set to "1" in step S606.

In step S607, the write position flag of the extracted history information is turned off. In step S608, a record corresponding to the record number whose write position flag is to be turned on is set. More specifically, the 8-bit model code is written, a NULL value is set at the 4-bit spare code, the 19-bit machine number is written, and the write position flag is set to "ON". In step S609, the updated history information is embedded in the image data.

[Grasp of Forgery History]

Figure 8:
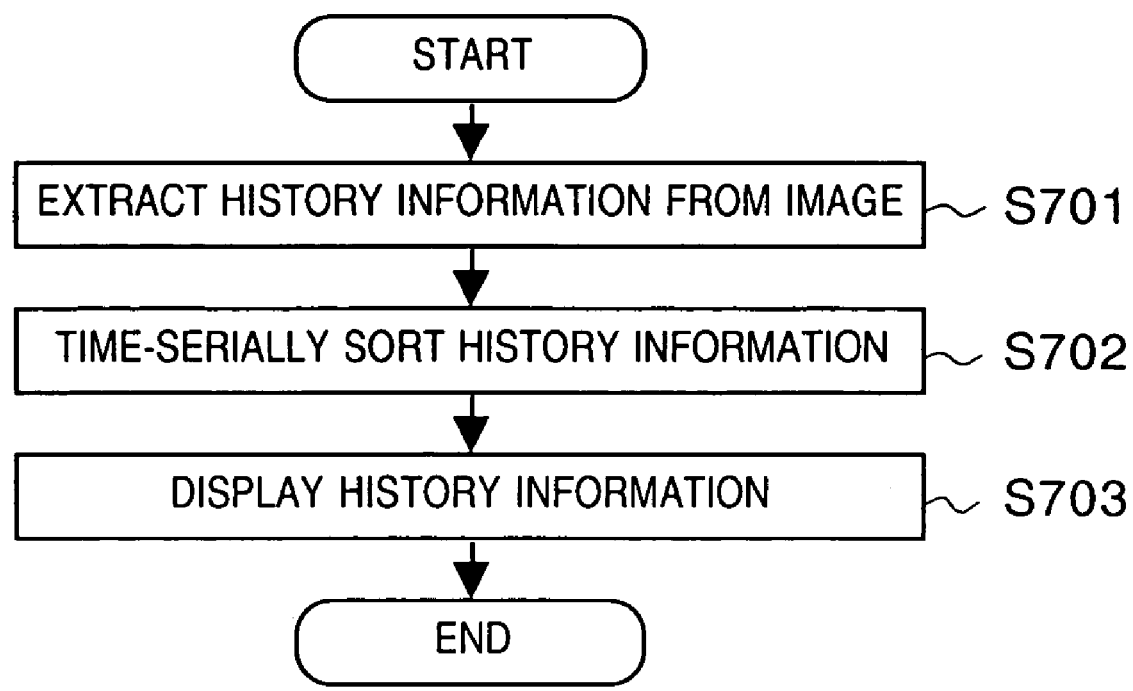
FIG. 8 is a flow chart showing processing of grasping forgery history.

FIG. 8 is a flow chart showing processing of grasping forgery history. This processing is executed by the software 109.

Referring to FIG. 8, history information embedded in the image 108 is extracted in step S701. In step S702, the records of the extracted history information are time-serially sorted on the basis of the write position flag states. In step S703, the obtained result, i.e., the sorted records of history information are displayed.

According to the first embodiment, if bills or securities are forged, the history of image reading, image processing, and image formation associated with this forgery can be time-serially displayed. For this reason, a plurality of apparatuses used for forgery can be specified, and persons involved in the forgery can be possibly tracked.

Second Embodiment

[Image Data Processing Path]

Figure 9:
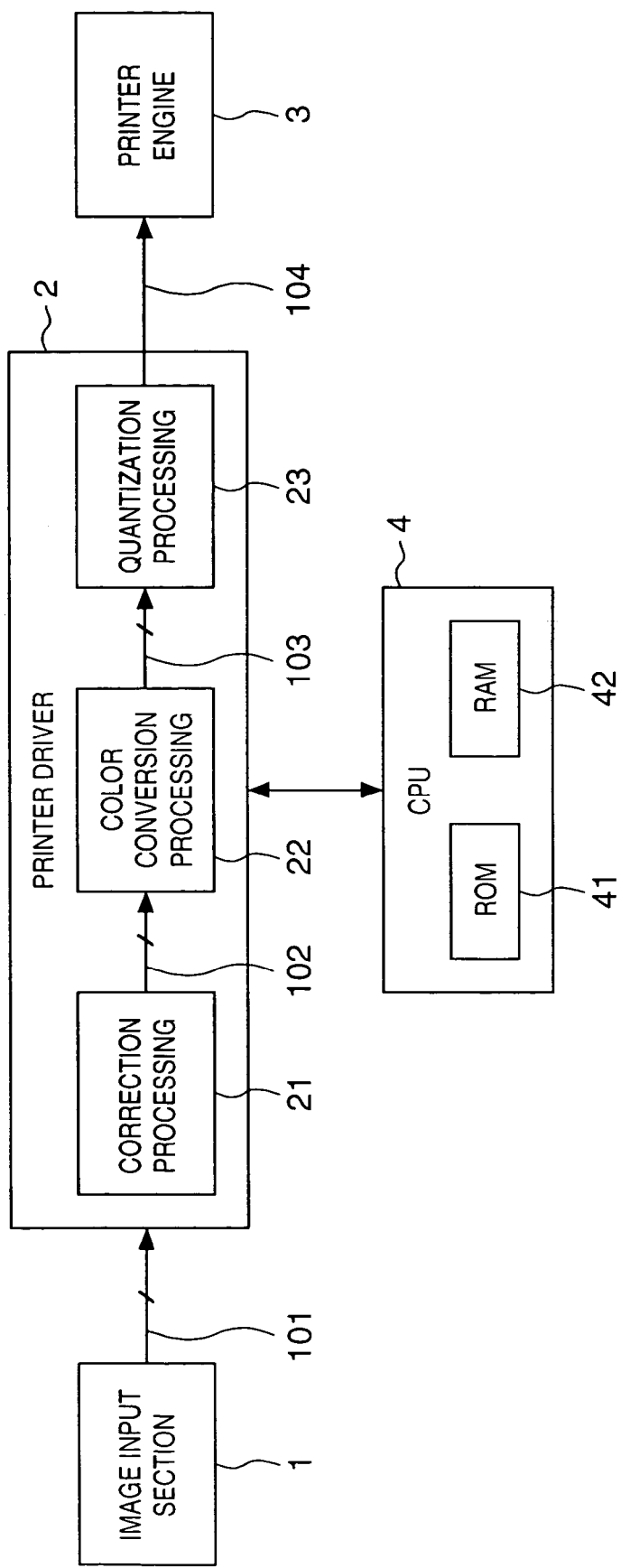
FIG. 9 is a block diagram showing the image data processing path in the embodiment.

FIG. 9 is a block diagram showing the image data processing path in this embodiment. An apparatus (so-called printer) having a print function will be described in the second embodiment. However, the present invention is not limited to this and can be applied to an apparatus which can, e.g., input, process, and output image data.

An image input section 1 such as a scanner, general-purpose interface, or network interface inputs image data constructed by R, G, and B components each having 8-bit data to a printer driver 2. In the printer driver 2, the image data 101 is converted into RGB data 102 having 8-bit color components in accordance with the characteristics of a printer engine 3 by correction processing 21 for performing masking processing and gamma correction. The RGB data 102 is converted into CMYK image data 103 having 8-bit color components by color conversion processing 22 for performing logarithmic conversion, masking processing, and undercolor removal processing. The CMYK image data 103 is further binarized by quantization processing 23 for performing pseudo-halftoning, so CMYK binary image data 104 having 1-bit color components is generated.

The CMYK binary image data 104 is sent to the printer engine 3 to print the image on a printing medium such as a paper sheet. When the resultant print is supplied to the image input section 1 such as a scanner, color image data having R, G, and B components can be obtained again.

[History Information Embedding]

In the second embodiment, electronic watermark information is embedded in each of the C, M, Y, and K color components. More specifically, in binarizing the CMYK image data 103, a plurality of dither patterns are switched, thereby embedding electronic watermark information. Before this embedding, it is determined whether electronic watermark information has been embedded in the CMYK image data 103 by this technique. If electronic watermark information has already been embedded, the color component in which the latest electronic watermark information has been embedded is determined.

In the second embodiment, the above-described history information is embedded using electronic watermark information. More specifically, history information representing an apparatus on the distribution route of an image or image data can be embedded in each of C, M, Y, and K color components. That is, four pieces of history information can be embedded at maximum. The pieces of history information are embedded in the order of, e.g., C, M, Y, and K colors. The latest history information is recurrently embedded.

Such electronic watermark information embedding and extraction and history information analysis and generation are performed by a CPU 4 which executes a program stored in a ROM 41 using a RAM 42 shown in FIG. 9 as a work memory.

Figure 10:
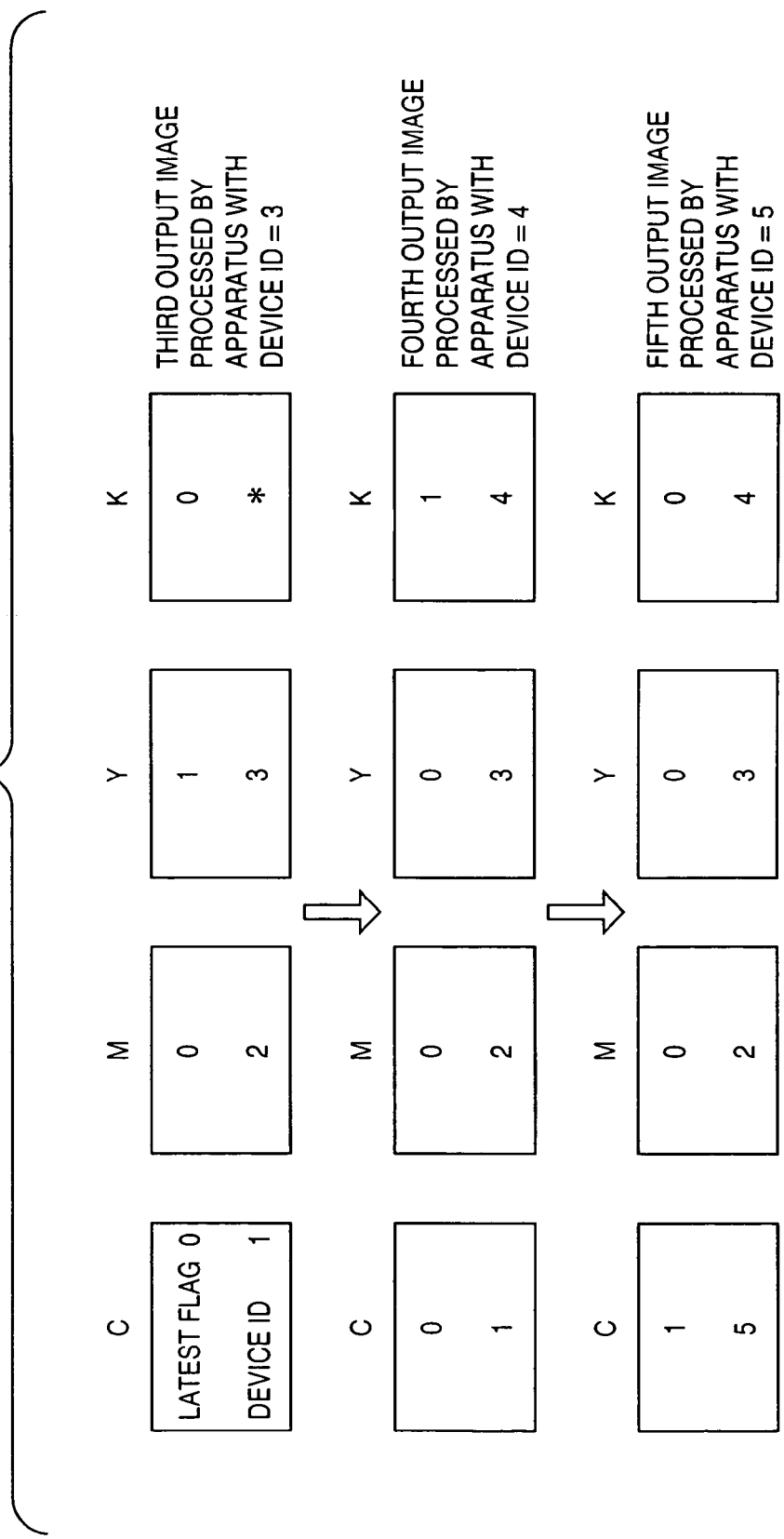
FIG. 10 is a view showing the concept of history information embedding order.

FIG. 10 is a view showing the concept of history information embedding order.

First, consider the third image output (printed) through the processing path shown in FIG. 9. In the third output image, a "device ID" and "latest flag" are embedded in each of the C, M, and Y color components as history information, as shown in FIG. 10. The device ID is an ID representing an apparatus that has output the image. The latest flag is a flag representing that the information is the latest one of the pieces of history information embedded in the image. "1" represents the latest information, and "0" represents that the information is not latest.

When the electronic watermark information is extracted from the third output image, the device IDs are obtained from the C, M, and Y color components, which represent that the image or image data was distributed via three apparatuses. Information representing that the device ID has no value ("*" in FIG. 10) is obtained from the K color component. In addition, as latest flags, "1" is obtained from the Y color component, and "0"s are obtained from the remaining color components.

A case wherein image data is read from the third output image to output (print) the fourth image will be described next.

RGB image data input from the image input section 1 (e.g., scanner) is converted into CMYK image data, and electronic watermark information embedded in the CMYK image data is extracted. In this case, device IDs are extracted from the C, M, and Y color components. The latest flags extracted from these color components indicate that the history information extracted from the Y color component is the latest information.

After this, history information is embedded by the method to be described later. The same history information as the extracted information is embedded in each of the C and M color components again. On the other hand, history information whose latest flag is changed from "1" to "0" is embedded in the Y color component. For the K color component, history information whose latest flag is changed from "0" to "1" and device ID representing no value is changed to a device ID ("4" in FIG. 10) representing the apparatus that has performed the fourth processing is embedded.

A case wherein image data is read from the fourth output image to output (print) the fifth image will be described next.

RGB image data input from the image input section 1 (e.g., scanner) is converted into CMYK image data, and electronic watermark information embedded in the CMYK image data is extracted. In this case, device IDs are extracted from the C, M, Y, and K color components. The latest flags extracted from these color components indicate that the history information extracted from the K color component is the latest information.

After this, history information is embedded by the method to be described later. The same history information as the extracted information is embedded in each of the M and Y color components again. On the other hand, history information whose latest flag is changed from "1" to "0" is embedded in the K color component. For the C color component, history information whose latest flag is changed from "0" to "1" and device ID ("1" in FIG. 10) representing the apparatus that has performed the first processing is changed to a device ID ("5" in FIG. 10) representing the apparatus that has performed the fifth processing is embedded.

As described above, in the second embodiment, the device ID and latest flag of history information are updated by repeatedly embedding the latest history information in each color component. In the second embodiment, the latest device ID is sequentially and recurrently embedded in the C, M, Y, and K color components, thereby embedding four pieces of history information in an image at maximum. In other words, history information representing four apparatuses that distributed the image or image data and the order thereof can be embedded in the image.

[History Information Embedding Method]

A method of embedding history information as electronic watermark information will be described next.

In the second embodiment, electronic watermark information embedding is executed in binarizing multilevel CMYK image data in units of colors. This concept will be briefly described.

Figure 18:
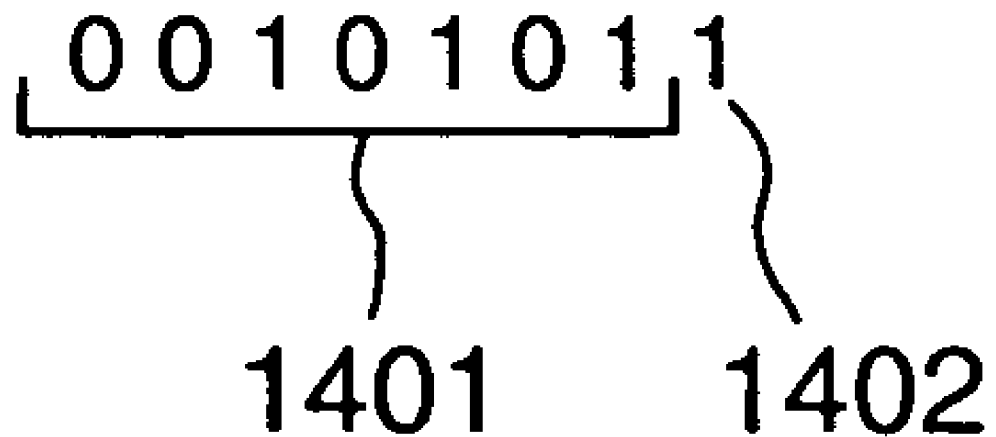
FIG. 18 is a view showing an example of a bit sequence of history information.

FIG. 18 is a view showing an example of a bit sequence of history information. Reference numeral 1401 denotes a 7-bit device ID; and 1402, a 1-bit latest flag. The history information has 8 bits. To embed this 8-bit information in binarizing a certain color component, fields corresponding to at least eight dither patterns are ensured from this color component data. In the eight fields, binarization is executed selectively using a dither pattern representing bit data "1" and dither pattern representing bit data "0", thereby embedding a piece of history information in the eight fields.

The two dither patterns are visually indistinguishable but are preferably distinguishable in terms of data. In the second embodiment, history information is embedded as electronic watermark information using at least first and second dither patterns to be described later.

[Dither Pattern]

FIGS. 11 to 15 are views showing fifth examples of a dither pattern used to embed electronic watermark information.

Figure 11:
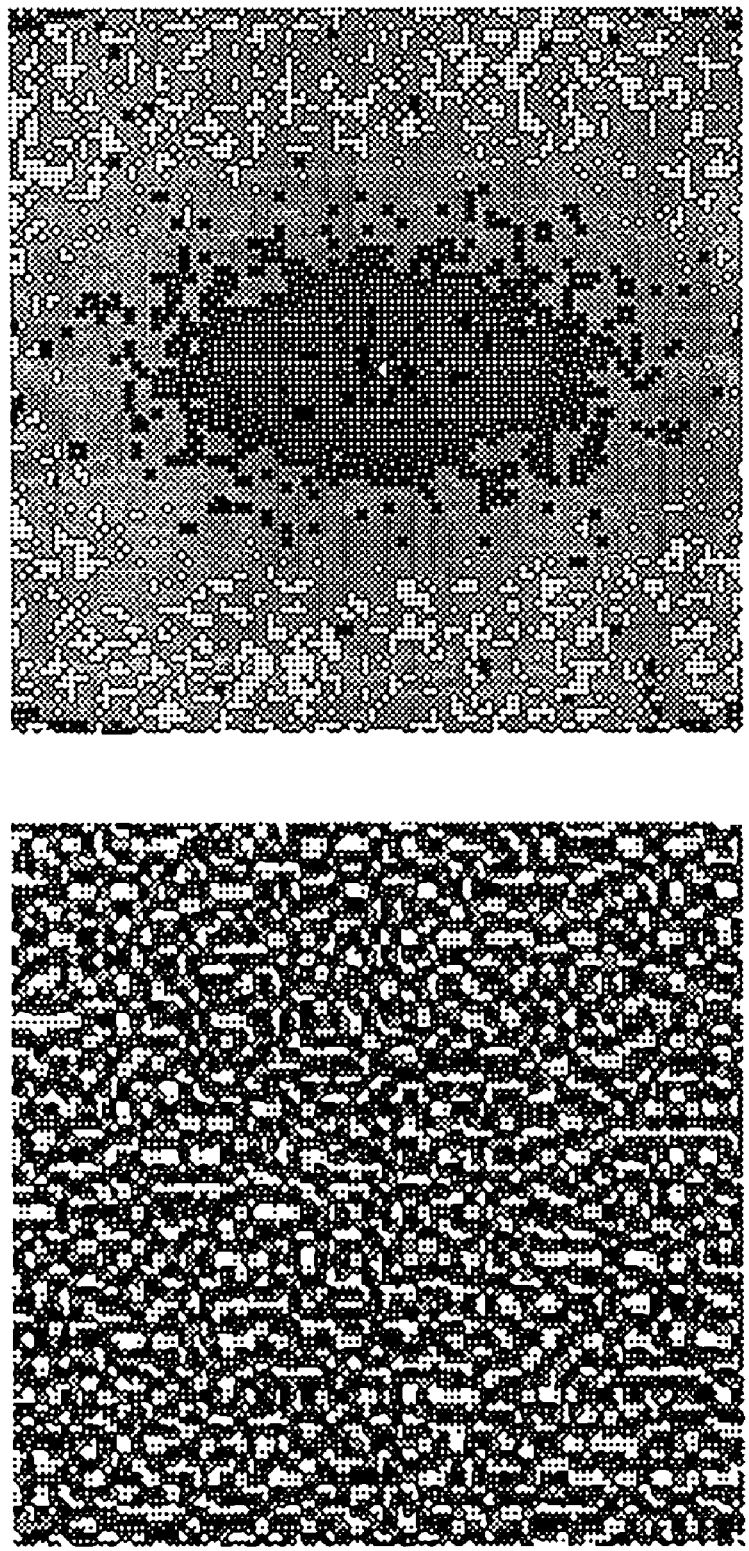
FIGS. 11 to 15 are views showing examples of a dither pattern used to embed electronic watermark information.

The left part of FIG. 11 shows the distribution of threshold values of an M×M dimensional dither pattern (first dither pattern). The threshold value takes values from 0 to 255. A black portion represents a threshold value "0". A portion close to white represents a threshold value close to 255. The threshold values in the dither pattern are dispersed to make visual identification difficult.

The right part of FIG. 11 shows the spectral distribution of amplitudes obtained by DFT (Discrete Fourier Transform) of the first dither pattern. The number of dimensions of this spectral distribution is also M×M. The center represents DC components, and the peripheral portion represents high-frequency (AC) components. As the distance from the center increases, the frequency becomes high. A black point indicates that the spectrum is weak. A point close to white indicates a strong spectrum.

As is apparent from FIG. 11, the frequency components of the dither pattern are biased to high-frequency components.

As a characteristic feature of the first dither pattern used in the second embodiment, high-frequency components are not uniformly distributed with respect to the DC component (center). More specifically, as is indicated shown by the right part of FIG. 11, a very small number of high-frequency components are distributed in the vertical direction from the center.

Figure 12:
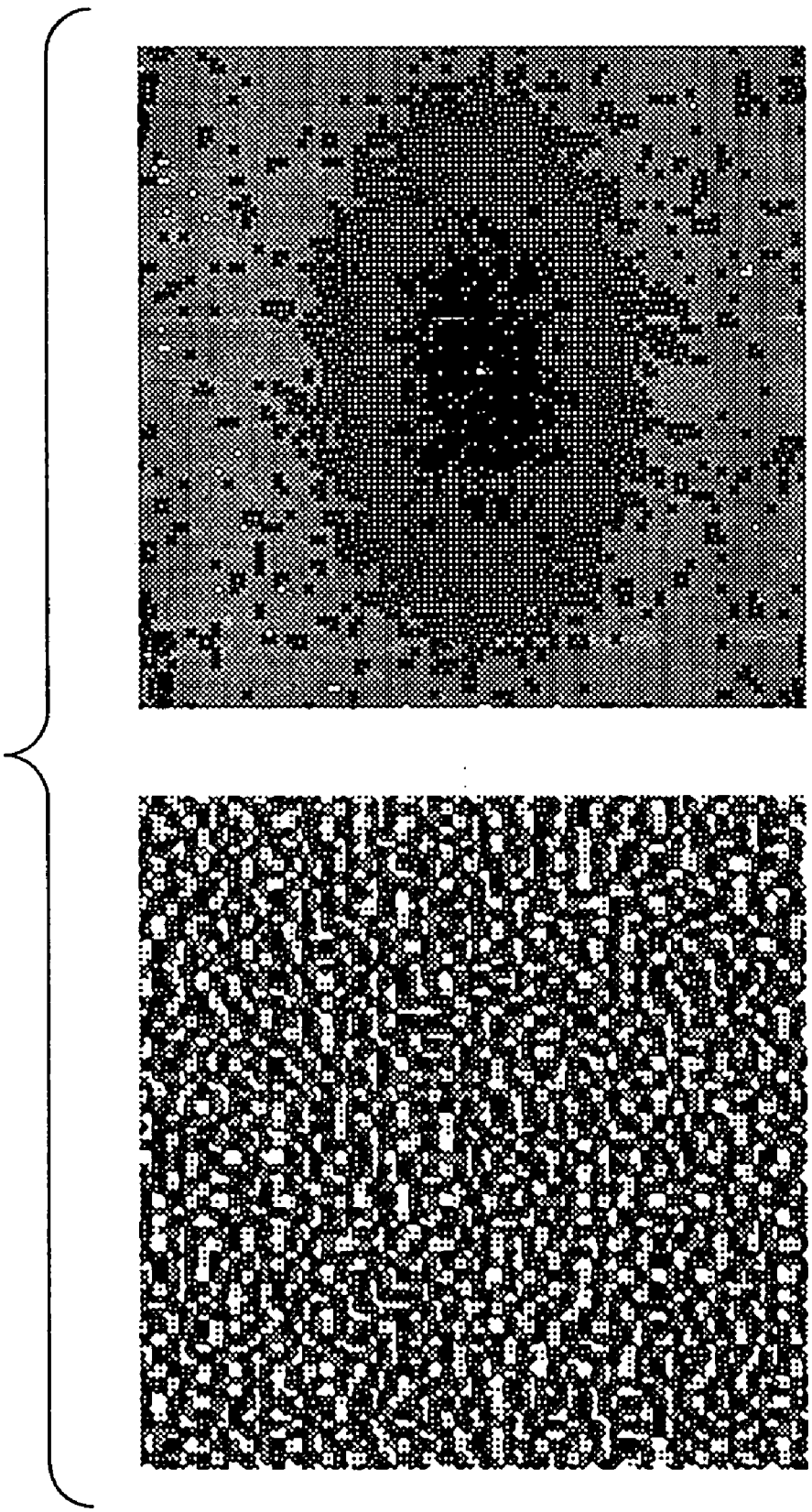

The left part of FIG. 12 shows the distribution of threshold values of another M×M dimensional dither pattern (second dither pattern). The right part of FIG. 12 shows the spectral distribution of amplitudes obtained by DFT (Discrete Fourier Transform) of the second dither pattern.

As a characteristic feature of the second dither pattern used in the second embodiment, high-frequency components are not uniformly distributed with respect to the DC component (center). More specifically, as is indicated by the right part of FIG. 12, a very small number of high-frequency components are distributed in the horizontal direction from the center.

When the two dither patterns shown in FIGS. 11 and 12 are selectively used, bits can be embedded in an image. However, if the same dither pattern is used for a plurality of color components, the image quality conspicuously degrades. To avoid this problem, dither patterns shown in FIGS. 13 to 15 may be prepared.

Figure 13:
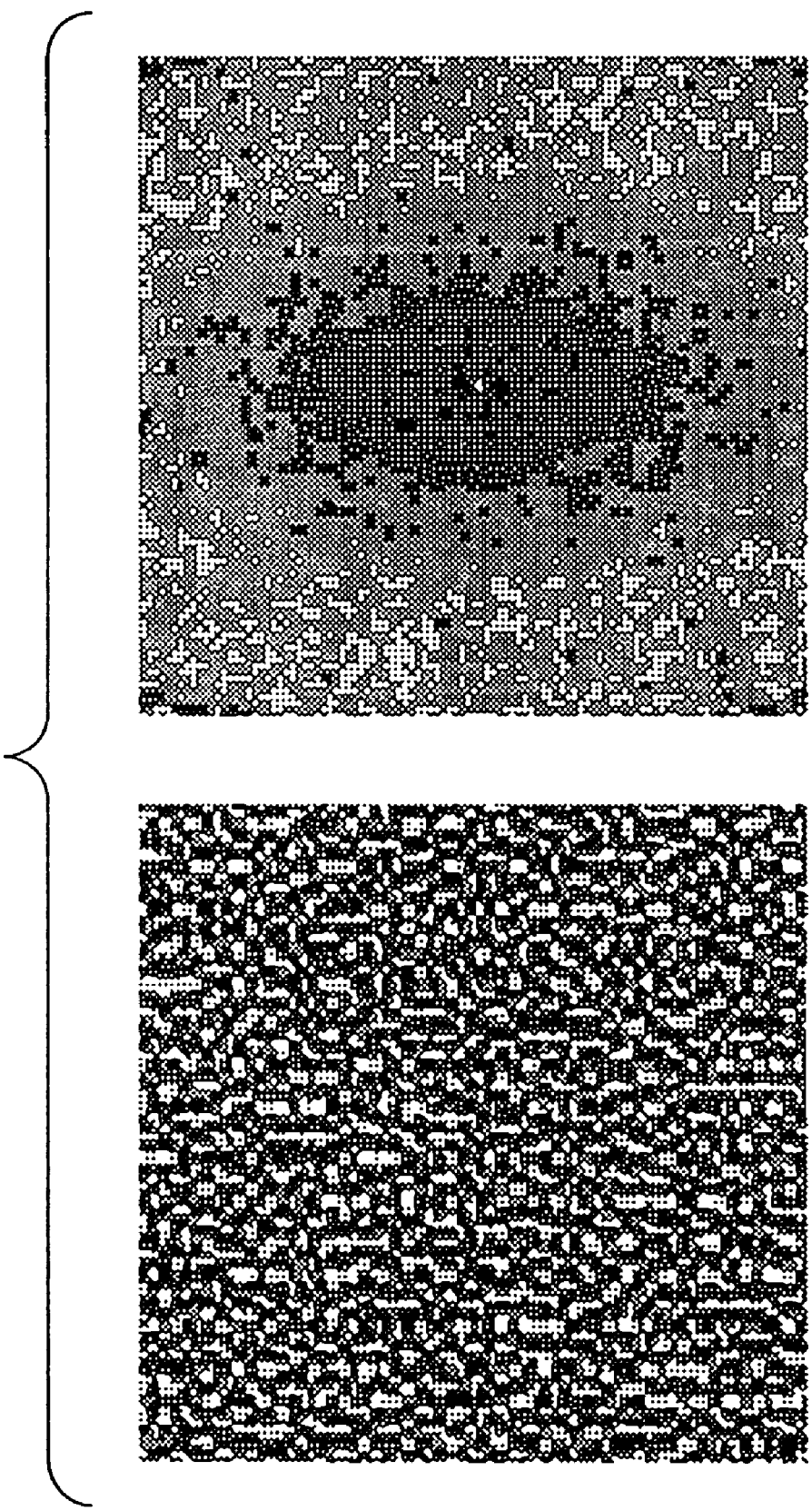

The left part of FIG. 13 shows the distribution of threshold values of still another M×M dimensional dither pattern (third dither pattern). The right part of FIG. 13 shows the spectral distribution of amplitudes obtained by DFT of the third dither pattern.

As a characteristic feature of the third dither pattern, high-frequency components are not uniformly distributed with respect to the DC component (center). More specifically, as is indicated by the right part of FIG. 13, a very small number of high-frequency components are distributed in the vertical direction from the center.

Although the first and third dither patterns have similar frequency characteristics, the threshold value arrays are different. This is because the first dither pattern is used to binarize the first color component, and the third dither pattern is used to binarize the second color component. When dither patterns having similar spectral distributions and different threshold value arrays are used to binarize different color components, the print positions of these color components hardly overlap.

Figure 14:
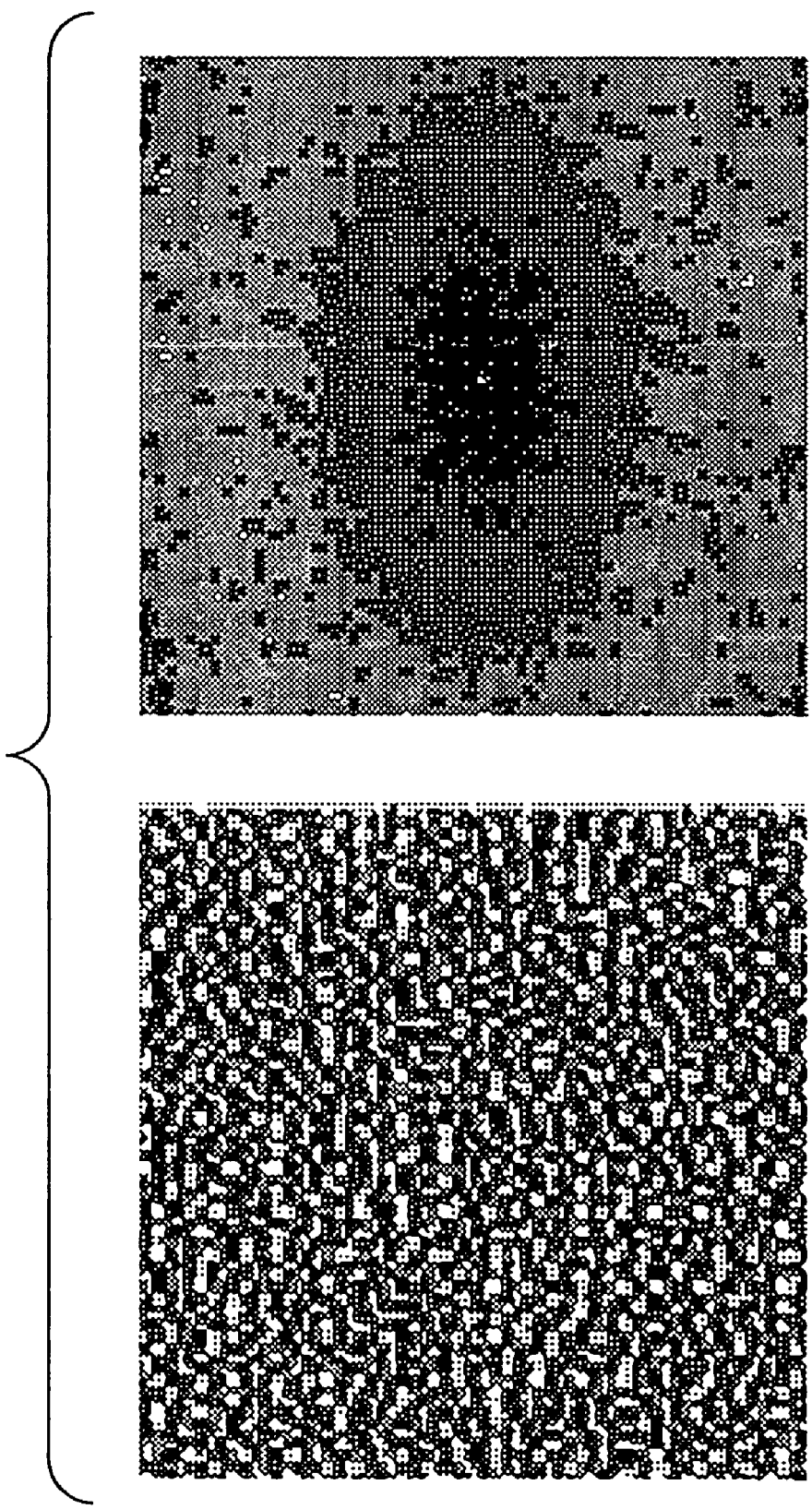

The left part of FIG. 14 shows the distribution of threshold values of still another M×M dimensional dither pattern (fourth dither pattern). The right part of FIG. 14 shows the spectral distribution of amplitudes obtained by DFT of the fourth dither pattern.

As a characteristic feature of the fourth dither pattern, high-frequency components are not uniformly distributed with respect to the DC component (center). More specifically, as is indicated by the right part of FIG. 14, a very small number of high-frequency components are distributed in the horizontal direction from the center.

Although the second and fourth dither patterns have similar frequency characteristics, the threshold value arrays are different, like the first and third dither patterns.

The first and second dither patterns can be used to embed electronic watermark information in, e.g., the C and Y color components, and the third and fourth dither patterns can be used to embed electronic watermark information in, e.g., the M and K color components. Fifth and sixth dither patterns, and seventh and eighth dither patterns, each pair having the same relationship as that between the first and second dither patterns, may be prepared, and electronic watermark information may be embedded using first and second dither patterns for the C color component, the third and fourth dither patterns for the Y color component, the fifth and sixth dither patterns for the M color component, and the seventh and eighth dither patterns for the K color component.

Figure 15:
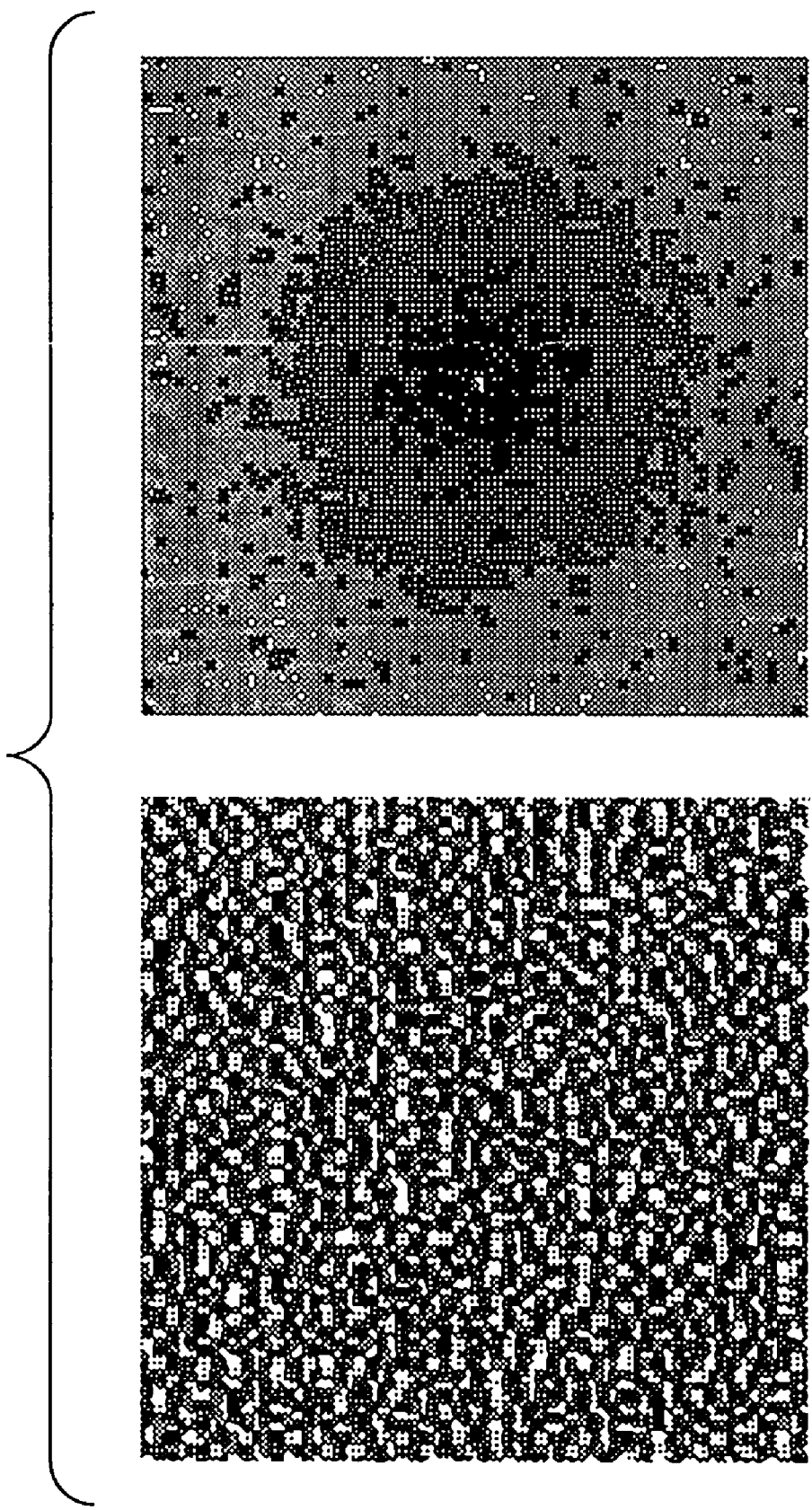

The left part of FIG. 15 shows the distribution of threshold values of a fifth M×M dimensional dither pattern. In the second embodiment, the fifth dither pattern serves as a basic dither pattern which is normally used for binarization when a color or region in which no electronic watermark information is to be embedded is present.

The right part of FIG. 15 shows the spectral distribution of amplitudes obtained by DFT of the fifth dither pattern. The spectral distribution of the fifth dither pattern has high-frequency components uniformly biased with respect to the DC component (center).

Each of the spectral distributions shown in FIGS. 11 to 14 has a larger absolute value of covariance than that of the spectral distribution shown in FIG. 15. In addition, in the spectral distributions obtained by converting the threshold values of the first and second dither patterns into frequency components, the high-frequency components are distributed in directions perpendicular to each other, as indicated by the right parts of FIGS. 11 and 12. This also applies to the third and fourth dither patterns.

The difference between the first dither pattern and the third dither pattern or the difference between the second dither pattern and the fourth dither pattern will be briefly described next.

FIG. 16 is a view showing the threshold value array of the first or second dither pattern when M=5. Numbers 1 to 25 are not threshold values themselves but indices representing array positions. FIG. 17 is a view showing the threshold value array of the third or fourth dither pattern when M=5. Unlike FIG. 16, the columns are shifted to the right by one-pixel distance. Hence, in units of pixels, a binarization result obtained using the first or third dither pattern and that obtained using the second or fourth dither pattern are different even when the original multilevel components are the same.

[History Information Embedding Processing]

Figure 19:
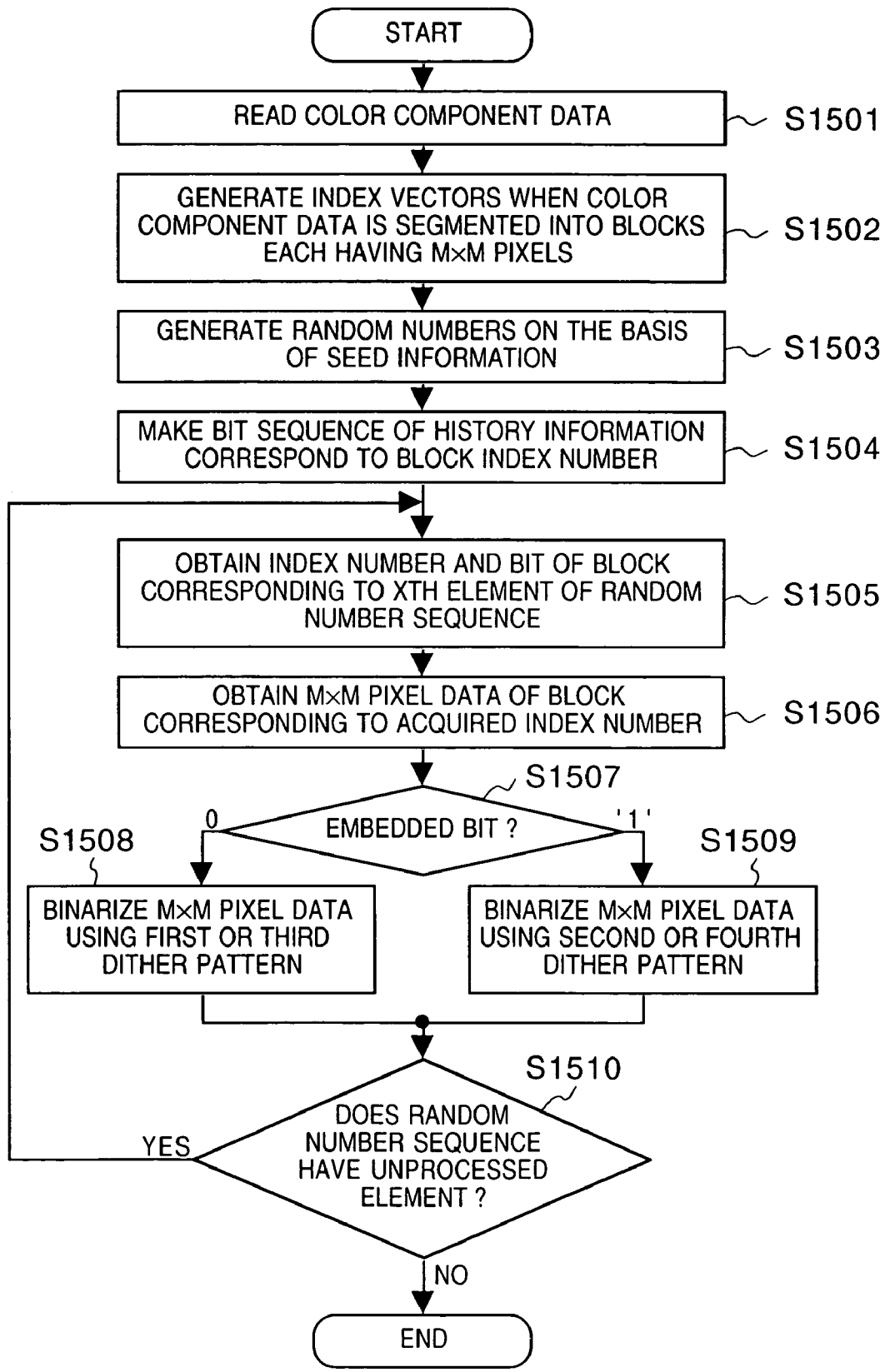
FIG. 19 is a flow chart showing processing of embedding history information in an image.

FIG. 19 is a flow chart showing processing of embedding history information in an image. A case wherein history information is to be embedded in the fourth output image shown in FIG. 10 will be described.

Figure 20:
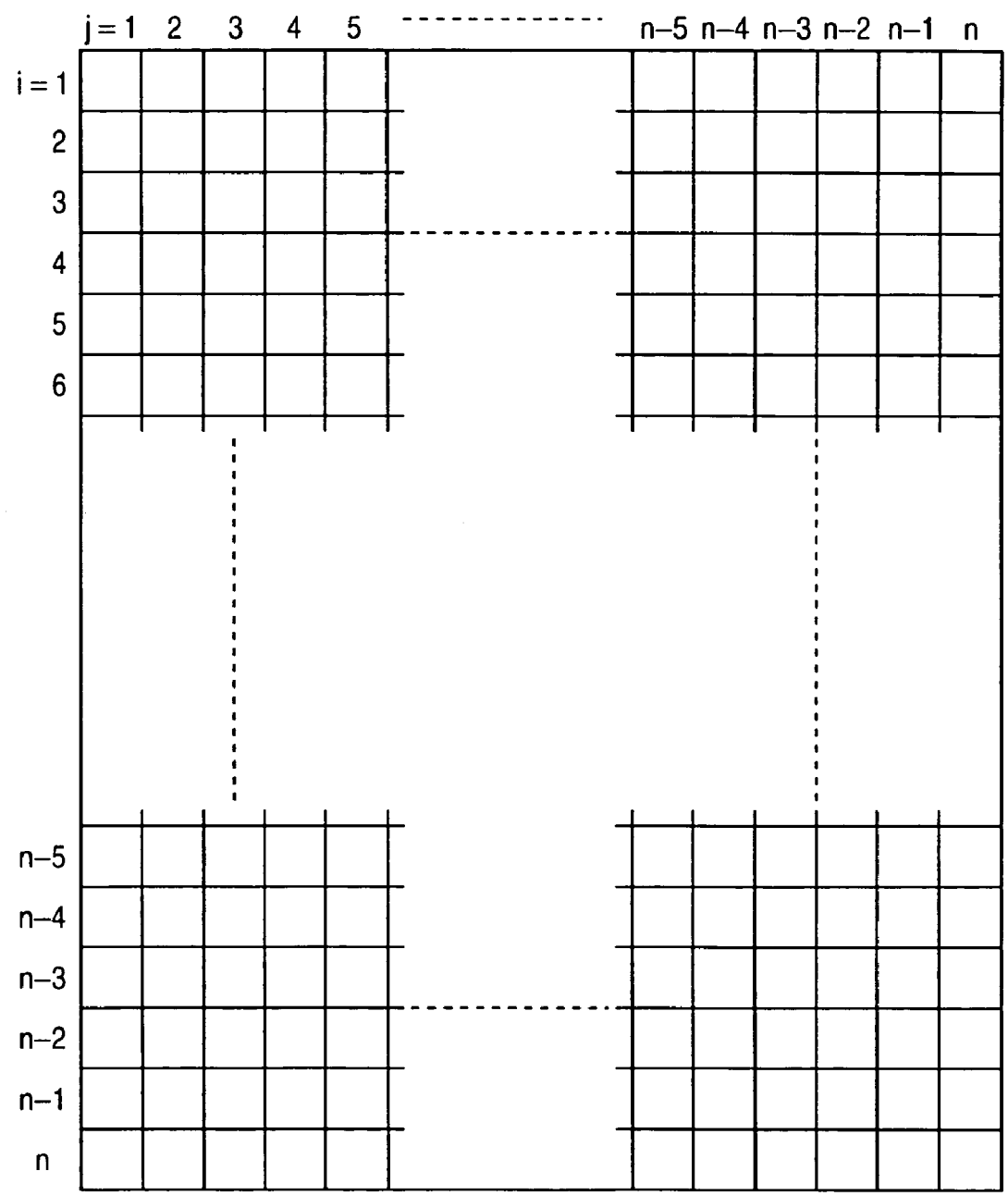
FIG. 20 is a view showing a state wherein color component data is segmented into blocks each having M×M pixels.

First, to embed history information in the C color component, image data of C color component (C component data) is read (S1501). As shown in FIG. 20, the C component data is segmented into blocks each having M×M pixels. Each cell shown in FIG. 20 represents a block containing M×M pixels. Indices i indicating row numbers are assigned in the vertical direction, and indices j indicating column numbers are assigned in the horizontal direction.

Referring to FIG. 20, the index numbers form an n×n matrix. From this index matrix, $n^2$-dimensional index vectors are generated (S1502). The element numbers of the index vectors correspond to the block index numbers.

Next, random numbers 1 to $n^2$ are generated on the basis of predetermined seed information or seed information input by the user (S1503). The generated random numbers correspond to the element numbers of generated index vectors. That is, the random numbers correspond to the block index numbers. An example of the bit sequence of history information shown in FIG. 18 is made to correspond to the block index numbers (S1504). After the bit sequence is assigned to the final bit, it is assigned from its first bit again.

Figure 21:
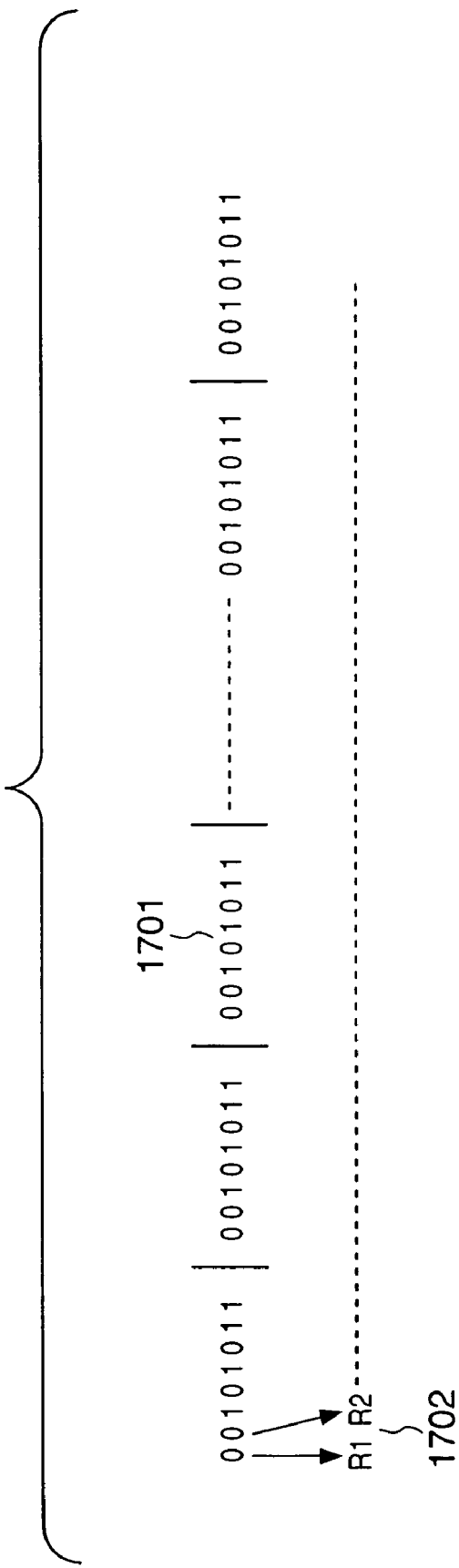
FIG. 21 is a view showing an example of correspondence between bit sequences, random number sequences, and block index numbers.

FIG. 21 is a view showing an example of correspondence between bit sequences, random number sequences, and block index numbers. Both the total number of bits of repetitive bit sequences 1701 and the number of elements of a random number sequence 1702 representing block index numbers are $n^2$.

An index number and bit corresponding to the first element x=1 of the random number sequence are obtained (S1505). M×M pixel data corresponding to the acquired index number is obtained (S1506), and the acquired bit is determined (S1507). If the bit is "0", the M×M pixel data is binarized using the first dither pattern. If the bit is "1", the M×M pixel data is binarized using the second dither pattern (S1508 or S1509).

On the basis of determination in step S1510, processing in steps S1505 to S1509 is repeated until all elements of the random number sequence are exhausted.

To embed history information in each of the M color component and Y color component, processing shown in FIG. 19 is executed for each of M component data and Y component data. To embed history information with the device ID "4" and latest flag "1" in the K color component, processing shown in FIG. 19 is executed for K component data. To embed history information in the M, Y, and K component data, the third, fifth, and seventh dither patterns are employed as the dither pattern used in step S1508, and the fourth, sixth, and eighth dither patterns are employed as the dither pattern use din step S1509, as needed.

Thus, the CMYK image data in which the pieces of history information are embedded as electronic watermark information is sent to the printer engine 3 as the image data 104 shown in FIG. 9, and the image is printed on a printing medium such as a paper sheet.

[History Information Extraction Processing]

Figure 22:
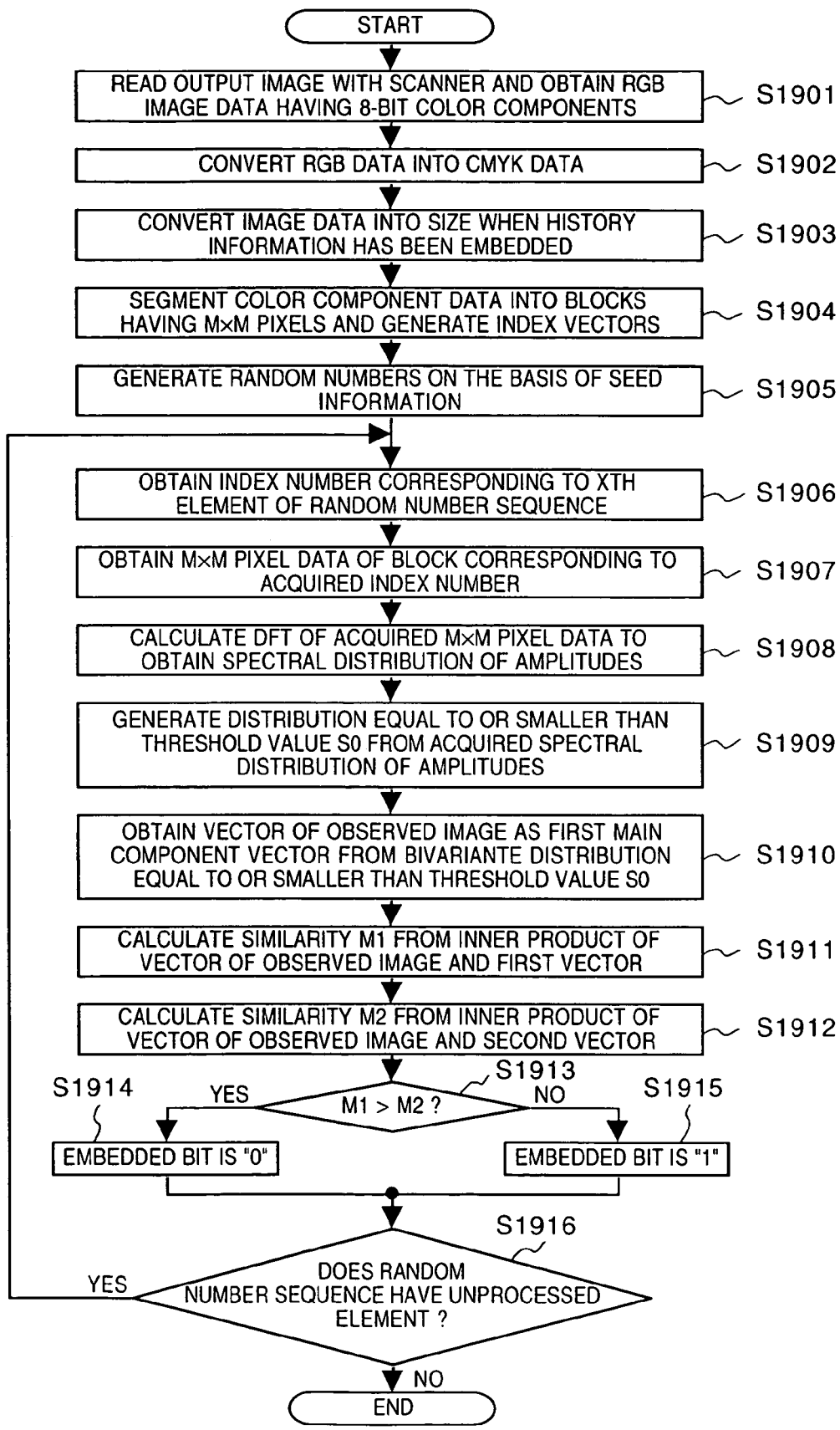
FIG. 22 is a flow chart showing processing of extracting history information embedded in an output image as electronic watermark information.

FIG. 22 is a flow chart showing processing of extracting history information embedded in an output image as electronic watermark information.

First, the image of a printed pattern is read by a scanner to obtain RGB data having 8-bit color components (S1901). The RGB image data is converted into CMYK image data (S1902).

The image data is converted (corrected) into an image size when history information has been embedded (S1903). After that, color component data is segmented into blocks each having M×M pixels, and $n^2$-dimensional index vectors are generated, as shown in FIG. 20 (S1904).

The image size conversion is done on the basis of a registration signal in the frequency domain of the image before and after electronic watermark embedding. More specifically, the image is converted into a signal in the frequency domain to detect the registration signal. On the basis of the relationship between the detection position (in the frequency domain) and the registration signal embedded position (in the frequency domain), the type of geometrical conversion (enlargement, reduction, rotation, or the like) executed for the image can be known. Hence, when the registration signal is detected, the image can be converted (corrected) into the image before the geometrical conversion.

As for the block size, block sizes are unified between the electronic watermark embedding program and the electronic watermark extraction program. However, the resolution of the image with the electronic watermark information, which is output to the printer, must be independently known.

Random numbers 1 to $n^2$ are generated on the basis of predetermined seed information or seed information input by the user (S1905). An index number corresponding to the first element x=1 of the random number sequence is obtained (S1906). M×M pixel data of a block corresponding to the acquired index number is obtained (S1907).

The spectral distribution of amplitudes is obtained by calculating the DFT of the M×M pixel data (S1908). A distribution equal to or smaller than a threshold value S0 is generated from the obtained spectral distribution of amplitudes (S1909). The first main component vector is obtained on the basis of the bivariante distribution equal to or smaller than the threshold value S0 (S1910). In each of the distributions as indicated by the right parts of FIGS. 11 and 12, the first main component vector corresponds to a vector in a direction in which a region having a distribution equal to or smaller than the threshold value S0 is distributed longest from the center.

The spectral distributions of amplitudes of the first and second dither patterns, the bivariante distribution equal to or smaller than the threshold value S0, and the first main component vector can be generated in steps S1908 to S1910. However, they may be generated in advance and stored in the ROM 41. The first main component vector of the first dither pattern will be called a "first vector", the first main component vector of the second dither pattern will be called a "second vector", and the first main component vector obtained from the M×M pixel data will be called a "vector of observed image" hereinafter.

Similarity M1 is calculated from the inner product of the resultant vector of observed image and first vector (S1911), and similarity M2 is calculated from the inner product of the vector of observed image and second vector (S1912). The similarities M1 and M2 are compared (S1913). If M1>M2, it is determined that the embedded bit is "0" (S1914). If M1≦M2, it is determined that the embedded bit is "1" (S1915).

On the basis of determination in step S1916, processing in steps S1906 to S1915 is repeated until all elements of the random number sequence are exhausted.

The extracted bit sequences are subjected to decision by majority, and the embedded bit sequence is reconstructed.

By executing the above processing for each color component data, history information embedded in each color component data can be extracted.

In the above-described example, the device ID is used as history information. However, the present invention is not limited to this, and an ID representing a user or device manufacturer may be used. In addition, history information may contain copyright information.

As described above, a plurality of types of electronic watermark information (device IDs) can be embedded in each color component. Even when a plurality of pieces of electronic watermark information are embedded as history information, the latest electronic watermark information can easily be discriminated by embedding a latest flag. Additionally, electronic watermark information can be added to the image while preferentially leaving later information.

As many apparently widely different embodiments of the present invention can be made without departing from the spirit and scope thereof, it is to be understood that the invention is not limited to the specific embodiments thereof except as defined in the appended claims.

The invention claimed is:

1. An image processing apparatus comprising:
   an input unit arranged to input image data; and
   an embedding unit arranged to embed first information and second information in the image data as electronic watermark information, the second information representing whether the first information is the latest information,
   wherein said embedding unit further embeds third information and fourth information, the fourth information representing whether the third information is the latest information.

2. The apparatus according to claim 1, wherein each of the first and third information specifies said apparatus.

3. An image processing method comprising the steps of:
   inputting image data; and
   embedding first information and second information in the image data as electronic watermark information, the second information representing whether the first information is the latest information,
   wherein the embedding step further embeds third information and fourth information, the fourth information representing whether the third information is the latest information.

4. A computer program product comprising a computer readable medium having a computer program code, for an image processing, comprising the procedure codes of:
   an inputting process procedure code for inputting image data; and
   an embedding process procedure code for embedding first information and second information in the image data as electronic watermark information, the second information representing whether the first information is the latest information,
   wherein said embedding process further embeds third information and fourth information, the fourth information representing whether the third information is the lates information.

5. An image processing apparatus comprising:
   an input unit arranged to input image data having a plurality of color components; and
   an embedding unit arranged to embed first information and second information in at least one of the plurality of color components in the image data as electronic watermark information, the second information representing that the first information is the latest information,
   wherein the first information is information for specifying said apparatus, and the second information represents that later information is not contained in a color component different from that in which the first information has been embedded.

6. The apparatus according to claim 5, wherein said embedding unit embeds the electronic watermark information as binary data in at least one of the plurality of color components.

7. The apparatus according to claim 5, wherein said embedding unit embeds the electronic watermark information as binary data in at least one of the plurality of color components by switching the dither pattern used.

8. An image processing method comprising the steps of:
   inputting image data having a plurality of color components; and
   embedding first information and second information in at least one of the plurality of color components in the image data as electronic watermark information, the second information representing that the first information is the latest information,
   wherein the first information is information for specifying said apparatus, and the second information represents that later information is not contained in a color component different from that in which the first information has been embedded.

9. A computer program product comprising a computer readable medium having a computer program code, for an image processing, comprising the procedure codes of:
   an inputting process procedure code for inputting image data having a plurality of color components; and
   an embedding process procedure code for embedding first information and second information in at least one of the plurality of color components in the image data as electronic watermark information, said second information representing that the first information is the latest information,
   wherein the first information is information for specifying said apparatus, and the second information represents that later information is not contained in a color component different from that in which the first information has been embedded.

* * * * *

UNITED STATES PATENT AND TRADEMARK OFFICE
CERTIFICATE OF CORRECTION

PATENT NO. : 7,058,198 B1  
APPLICATION NO. : 09/587906  
DATED : June 6, 2006  
INVENTOR(S) : Tomoyuki Miyashita It is certified that error appears in the above-identified patent and that said Letters Patent is hereby corrected as shown below:

SHEET NO. 22 of 22: (Box S1910)
Figure 22, "BIVARIANTE" should read --BIVARIANT--.

COLUMN 1:
Line 55, "be embedded in images as many" should read --to be embedded in as many images--.

COLUMN 2:
Line 31, "apparatuses." should read --apparatuses;--.

COLUMN 10:
Line 6, "use din" should read --used in--.
Line 55, "bivariante" should read --bivariant--.
Line 63, "bivariante" should read --bivariant--.

COLUMN 12:
Line 11, "lates" should read --latest--.

Signed and Sealed this

Twenty-second Day of May, 2007

JON W. DUDAS
*Director of the United States Patent and Trademark Office*